March 2, 1971 W. D. MADDISON ET AL 3,566,696
VALVE STEM
Filed Dec. 24, 1968
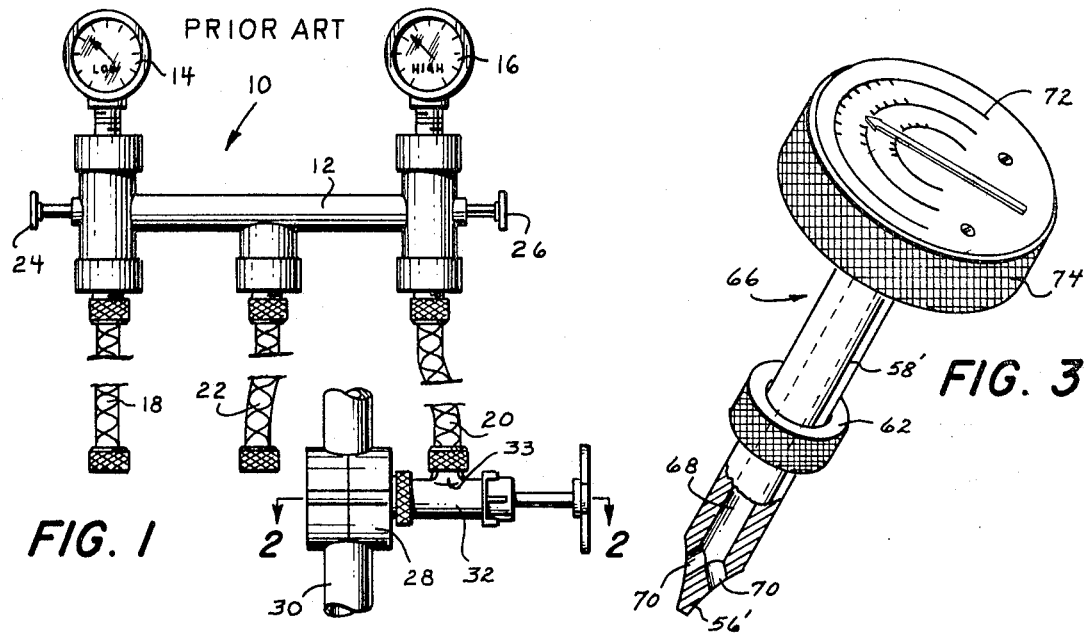
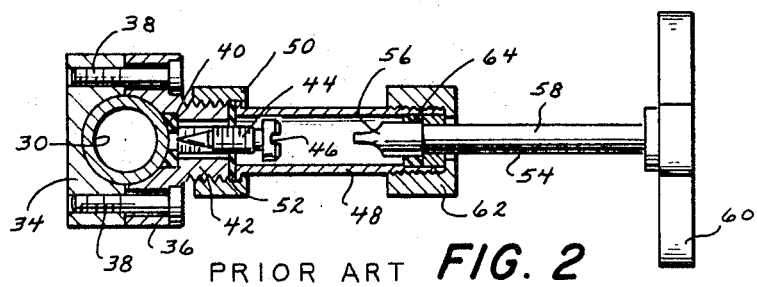
INVENTORS
WILLIAM D. MADDISON
JAMES J. DELADE
BY
Bernard J. Murphy
AGENT

United States Patent Office 3,566,696
Patented Mar. 2, 1971

3,566,696
VALVE STEM
William D. Maddison, 112 E. Shore Road, Denville, N.J. 07834, and James J. De Lade, Butler, N.J. (195C Main St., Little Falls, N.J. 07424)
Filed Dec. 24, 1968, Ser. No. 786,560
Int. Cl. G01l 7/00
U.S. Cl. 73—420                                   7 Claims

ABSTRACT OF THE DISCLOSURE

A valve stem operative of a valvular assembly which carries a fluid gauge on the "handle end" thereof. The stem is bored through to admit fluid therethrough for registration of the condition thereof on said gauge, and said gauge constitutes the manipulating handwheel as well.

---

This invention pertains to valve stems, and in particular to valve stems operative of valvular assemblies for admitting fluid through said assemblies—for venting said fluid, or for passing said fluid therethrough to gauge means for reading thereon the conditions of the fluid.

In the prior art, such valve stems serve a very singular purpose of causing valving operation of the assemblies in which they are integrated. Such stems are effective for opening the assemblies, however it is the practice to have additional conduity or piping or hose coupled to the assemblies for communicating the released fluid with associated gauges, the gauges being through connected with the conduitry, piping, or hose of some considerable length.

There are applications of indeterminate number in which this prior art arrangement is unsatisfactory. For instance, in refrigeration and air conditioner servicing, where it is necessary to use a line tap valve together with a charging and testing unit of gauges, hoses, and piping manifold, the arrangement is especially unsatisfactory. The hoses, customarily of some thirty inches in length, are responsible for disposing the gauges at a remote distance from the line which is being tapped. In addition, the hoses have a given volume of no insignificant measure which arithmetically adds to the volume of the line of the appliance being gauged; accordingly an inaccurate pressure or capacity is unavoidably read on the operative gauge.

In any application, be it appliance servicing, or in valving and gauging any fluid container, it is extremely inconvenient to operate a fluid valve at one location and then have to move to another location—and/or direct one's attention to another location—to study a gauge responsive to the valve operation.

It is an object of our invention, then, to teach an improved valve stem having means carried therewith for gauging fluid conditions, to overcome the herebefore noted limitations found in the prior art.

A feature of our invention comprises the provisioning of a valve stem having a hollow shaft for communicating fluid therethrough to a fluid-condition-reading gauge carried by said stem.

Further objects and features of our invention will become more apparent by reference to the following description taken in conjunction with the accompanying figures, in which:

FIG. 1 is a front elevational view of an arrangement, as practiced in the prior art, for tapping, testing, and charging a fluid line;

FIG. 2 is a longitudinal view, in cross-section, of a "control valve" operatively coupled to a tap valve, in accordance with the arrangement of FIG. 1; and FIG. 3 is an isometric view, partly in cross-section, of the improved valve stem, according to our invention in one embodiment thereof.

As is evidenced in FIG. 1, it is the practice in prior art to test and charge an appliance's fluid tubing by using a "charging and testing unit" 10. The unit 10 comprises a manifold 12 which couples thereto a low pressure gauge 14 and a high pressure gauge 16. Opposite the gauge coupling, low pressure flexible hose 18 and high pressure flexible hose 20 are also coupled to manifold 12. A charging flexible hose 22 is through connected with the manifold intermediate hoses 18 and 20, and oppositely-extending handwheels 24 and 26 project from the manifold. Handwheels 24 and 26 independently operate valving (not shown) within manifold 12 to communicate the charging hose 22 with either hose 18 or hose 20, respectively.

A line tap valve, as it is called, index number 28, receives the fluid tubing 30 therewithin, and couples thereto the control valve 32. The control valve 32 has a fluid branch adapter 33 which, in this instance, is coupled to hose 20 for admitting fluid to gauge 16 and, if necessary, for admitting charging fluid to fluid tubing 30.

FIG. 2, which is an enlarged, cross-sectional view taken along section 2—2 of FIG. 1, illustrates in more detail the construction and operative relationship of the prior art devices for tapping, bleeding, and resealing a fluid line. The line tap valve comprises a backing sleeve half 34 and a penetration sleeve half 36 which halves are secured about the tubing 30 by means of screws 38. The penetration half 36 carries a seal 40 in a recess for closing off the tubing 30 after the purposes of the penetration thereof have been satisfied.

Line tap valve half 36 comprises an extending adapter 42 which is internally threaded therein to receive a threaded tapping needle 44 which has a drive slot 46. A tube 48 encloses the needle 44 and is secured at one end onto adaptor 42, with an annular seal 52, by means of cap 50. Tube 48 also confines a portion of a screw-driver key 54. Key 54, being the "valve stem" for the line tap valve, has a drive head 56—for driving engagement with slot 46—a shaft 58, and a termination handle 60. A cap 62 retains the drive head 56 in tube 48, and a seal 64 fluid-seals that end of the tube.

In operation, the screw-driver key 54 is pushed into tube 48 until it engages the needle 44. The key is turned until it "finds" the slot 46, and drive head 56 nests therein, then it is turned further until needle 44 penetrates both seal 40 and tubing 30. Next, the key 54 is turned in the opposite direction to withdraw the needle from tubing 30, until fluid is "thieved" and passed to the fluid branch adapter 33 (FIG. 1) for communication with gauge 16. Accordingly, a reading is taken on gauge 16; if the appliance being serviced requires fluid charging, then handwheel 26 is employed. To charge the appliance, a fluid supply is coupled to charging line 22, handwheel 26 is turned to admit the supply to line 20 and thence to tubing 30.

When the testing and perhaps charging is completed, the screw-driver key 54 is used to turn the needle 44 into tubing 30 again, sufficiently to close the penetration, and then cap 50 is turned to uncouple the control valve 32 therefrom. Finally, a closed cap (not shown) is positioned securely on adapter 42 to insure a complete seal of the penetration.

Now consider, lines 18 and 20, for instance, are some thirty inches in length. Therefore, the manifold 12 must be suspended on some thing, or somewhere, while the serviceman makes the hook-up of the tap valve 28 and the control valve 32. The service-man will operate the "valve stem" key 54, and then he must find the gauge 16, which is approximately some three feet away, to note the fluid reading. Also, where the lines 18 and 20 have a ¼-inch inside diameter, let us say, each one adds nearly one and a half cubic inch of volume to the test condition, and some four-fifths of an ounce capacity. Then too, there is the added fluid volume and capacity disposed between line 20 and gauge 16—in manifold 12—which will nearly sum the test condition with an erroneous one and three-quarters cubic inch of volume and a full ounce of fluid capacity.

Under conditions like these, it is largely impossible to get a valid reading on the appliance under test.

The valve stem of our invention significantly avoids these problems. One embodiment of our invention takes the form of an improved screw-driver key 66 as shown in FIG. 3. Key 66, as will be apparent, is usable in the control valve 32, in having a drive head 56' for driving engagement with drive slot 46. However, it is our teaching to provision a shaft 58' which has a fluid passageway 68 formed therein. Passageway 68 terminates adjacent to the drive head 56' where it then opens on diagonal ports 70. The end of the shaft 58' which is opposite the drive head 56' mounts a gauge 72 for fluid communication with the passageway 68.

Those skilled in the art to which our invention pertains have an understanding of differing ways in which to operatively couple a fluid-responsive gauge to a passageway. Accordingly, we pursue no details of this nature in our specification; it is sufficient, for an understanding of our invention, to state that gauge 72 represents a fluid responsive gauge which is flow-communicated with passageway 68, and it is secured to said opposite end of shaft 58'.

The teaching of our invention comprises the provisioning of gauge 72 with a knurled grip surface about the periphery thereof. In this manner of fabrication, gauge 72 serves the function of a handwheel.

In using our screw-driver key 66 in place of the screw-driver key 54 (FIG. 2), the entire cumbersome and expensive charging and testing unit 10 (FIG. 1) can be dispensed with.

The practice of the use of our invention, together with the known line tap valve 28, provides a compact unit which can easily be carried in a pocket. But more than this, our invention provides for greater accuracy in testing and charging of appliances.

We envision a shaft 58' of some two inches in length, with a one-eighth inch diameter fluid passageway 68. With such dimensions—given only for purposes of illustration— our screw-driver key 66 presents a volume of less than two and a half hundredths of a cubic inch, and a capacity of less than one-sixty-fourths of an ounce.

As we say, no specific dimensional limitations define our inventive screw-driver key 66. However, it is proposed to provision such keys 66 in dimensions which are wholly compatible with the known control valves—such as control valve 32, in FIG. 1—and configured for effecting engagement and operation of the known line top valves—such as line tap valve 28, in FIG. 1.

In essence, our screw-driver key 66 comprises a valve stem engageable with a valving component, for effecting operation of the latter, with a fluid gauge fixed thereto and a bored-through conduit for communicating fluid therethrough. Broadly, then, our inventive valve stem will have unspecified and varying applications.

As noted before, our novel valve stem is limited to no given dimensions, and it is limited to no given fluid. A range of fluids, comprising air, other gases, steam, liquids, and others, can be served by our invention. Nor do we propose to limit our manual-torquing-facilitating gauge 72 and to a gauge sensitive to any one given property of fluids; rather we contemplate the use of gauges which will sense, measure, and indicate pressure in one application, heat in another application, and so on. Accordingly, whatever the dimensions or applications of the valve stem, all dimensions and applications are within the spirit of our invention.

While we have described our invention, then, in connection with specific embodiments thereof, it is to be clearly understood that this is done only by way of example and not as a limitation to the scope of our invention as set forth in the objects thereof and in the accompanying claims.

We claim:

1. A valve stem, for use with a fluid-controlling, mechanical valvular assembly having a component movable for causing valving comprising:
   a shaft;
   said shaft having first means carried at one end thereof both for engaging and for causing valving-operation movement of said component;
   second means carried at the other end thereof for sensing fluid conditions; and
   third means which provide fluid communication between said one end and said second means; wherein said first means comprise a screw-driver-type key.

2. The invention, according to claim 1, wherein said second means comprise means for gauging fluid conditions.

3. The invention, according to claim 1, wherein said second means comprise means for indicating fluid conditions.

4. The invention, according to claim 3, wherein said second means further comprise handwheel means for facilitating torquing of said shaft.

5. The invention, according to claim 1, wherein said third means comprise conduitry formed within said shaft for conducting fluid therethrough.

6. The invention, according to claim 1, wherein:
   said second means comprise a fluid gauge;
   said gauge being of circular configuration, and having a knurled peripheral wall for facilitating manual torquing of said shaft.

7. The invention, according to claim 1, wherein:
   said third means comprise a bored-through passageway; and
   said second means comprise a gauge disposed at one end of said passageway for receiving fluid from said pasageway to signal at least a given condition of said fluid.

References Cited

UNITED STATES PATENTS

| | | | |
|---|---|---|---|
| 988,917 | 4/1911 | Walker | 73—420 |
| 2,017,365 | 10/1935 | Klein | 137—318 |
| 3,102,427 | 9/1963 | Trostel | 73—420 |

FOREIGN PATENTS

| | | | |
|---|---|---|---|
| 563,633 | 6/1957 | Italy | 73—420 |

DONALD O. WOODIEL, Primary Examiner